(12) United States Patent
Sunwoo et al.

(10) Patent No.: US 10,691,624 B2
(45) Date of Patent: Jun. 23, 2020

(54) UNIVERSAL FLASH STORAGE, ELECTRONIC DEVICE CAPABLE OF CONNECTING TO A PLURALITY TYPE OF MEMORY DEVICES AND METHOD THEREOF

(71) Applicant: Samsung Electronics Co., Ltd., Suwon-si, Gyeonggi-do (KR)

(72) Inventors: Seunghui Sunwoo, Suwon-si (KR); Jungsik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/412,881

(22) Filed: May 15, 2019

(65) Prior Publication Data
US 2019/0354493 A1 Nov. 21, 2019

(30) Foreign Application Priority Data
May 17, 2018 (KR) ........................ 10-2018-0056444

(51) Int. Cl.
*G06F 13/38* (2006.01)
*G06F 13/40* (2006.01)
*G06F 13/16* (2006.01)
*H01R 12/72* (2011.01)
*G06F 1/26* (2006.01)

(52) U.S. Cl.
CPC ............ *G06F 13/1668* (2013.01); *G06F 1/26* (2013.01); *G06F 13/4022* (2013.01); *H01R 12/721* (2013.01)

(58) Field of Classification Search
CPC ................................ G06F 13/38; G06F 13/40
See application file for complete search history.

(56) References Cited

U.S. PATENT DOCUMENTS

| | | | |
|---|---|---|---|
| 9,552,318 B2 * | 1/2017 | Shin | ................... G06F 13/4022 |
| 9,893,484 B2 | 2/2018 | Lee et al. | |

(Continued)

FOREIGN PATENT DOCUMENTS

| | | |
|---|---|---|
| KR | 10-2016-0065644 A | 6/2016 |
| KR | 10-2017-0136830 A | 12/2017 |

OTHER PUBLICATIONS

US 9,514,082 B2, 12/2016, Shin et al. (withdrawn)

(Continued)

*Primary Examiner* — David E Martinez
(74) *Attorney, Agent, or Firm* — Jefferson IP Law, LLP

(57) ABSTRACT

An electronic device including a connector and a method therefor are provided. The electronic device includes a connector for mounting at least one of a universal flash storage (UFS) card, a secure digital (SD) card, or a universal integrated circuit card (UICC). The connector includes a first power terminal for connecting the SD card or the UFS card, a second power terminal for connecting the UFS card or the UICC, and one or more signal terminals for connecting at least one of the UFS card, the SD card, and the UICC, and a processor configured to detect a card mounted in the connector, output to the UFS card a first designated voltage and a second designated voltage, and reset the UFS card through the one or more signal terminals, or output the first designated voltage and a third designated voltage, and reset a corresponding SD card or the UICC.

23 Claims, 15 Drawing Sheets

(56) References Cited

U.S. PATENT DOCUMENTS

| | | |
|---|---|---|
| 2005/0038956 A1 | 2/2005 | Yeh et al. |
| 2010/0294843 A1 | 11/2010 | Kim |
| 2015/0079847 A1* | 3/2015 | Liu .................... H01R 12/721 |
| | | 439/630 |
| 2015/0143022 A1 | 5/2015 | Shacham et al. |
| 2015/0356040 A1* | 12/2015 | Shin ................... G06F 13/4022 |
| | | 711/103 |
| 2015/0380844 A1 | 12/2015 | Lee et al. |

OTHER PUBLICATIONS

HeeChangCho, Next Generation of Mobile Storage : UFS and UFS Card, Aug. 2016—all pages (Year: 2016).*
International Search Report and Written Opinion dated Sep. 6, 2019, issued in an International application No. PCT/KR2019/005845.
JEDEC Standard; "Universal Flash Storage (UFS) Version 2.0"; JESD220B; JEDEC Solid State Technology Association (Sep. 2013), 3103 North 10th Street, Suite 240 South Arlington, VA 22201-2107.

* cited by examiner

UNIVERSAL FLASH STORAGE, ELECTRONIC DEVICE CAPABLE OF CONNECTING TO A PLURALITY TYPE OF MEMORY DEVICES AND METHOD THEREOF

CROSS-REFERENCE TO RELATED APPLICATION(S)

This application is based on and claims priority under 35 U.S.C. § 119 of a Korean patent application number 10-2018-0056444, filed on May 17, 2018, in the Korean Intellectual Property Office, the disclosure of which is incorporated by reference herein in its entirety.

BACKGROUND

1. Field

The disclosure relates to a universal flash storage, an electronic device capable of connecting to various types of a memory device, and a method thereof.

2. Description of Related Art

With advances in technology, various external memory devices are supplied to supplement functionality of an electronic device. Such an electronic device may execute its function or expand its limited resource and functionality by mounting up to two external memory devices, connecting the mounted memory device, and transceiving data.

The electronic device may transmit and receive data by mounting and connecting an external electronic device. However, since a size of the electronic device is limited, other memory device of a new type than memory devices of existing types may not be added due to the limited space. If memory devices of different connection types are selectively mounted in the same space to save the space, the memory device or the electronic device may be damaged in mounting and connecting the memory and a memory device of a new type may not be mounted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an electronic device with a connector.

Additional aspects will be set forth in part in the description which follows and, in part, will be apparent from the description, or may be learned by practice of the presented embodiments.

In accordance with an aspect of the disclosure, an electronic device is provided. The electronic device includes a connector for mounting at least one of a universal flash storage (UFS) card, a secure digital (SD) card, or a universal integrated circuit card (UICC). The connector includes a first power terminal for connecting the SD card or the UFS card, a second power terminal for connecting the UFS card or the UICC, and one or more signal terminals for connecting at least one of the UFS card, the SD card or the UICC, and at least one processor. The at least one processor is configured to detect a card mounted in the connector, if the card corresponds to the UFS card, output to the UFS card a first designated voltage through the first power terminal and a second designated voltage through the second power terminal, and reset the UFS card through the one or more signal terminals, and if the card does not correspond to the UFS card, output the first designated voltage through the first power terminal and a third designated voltage through the second power terminal, and reset a corresponding one of the SD card and the UICC through the one or more signal terminals.

In accordance with another aspect of the disclosure, a UFS is provided. The UFS includes a housing which is detachable from an electronic device, a first power terminal for receiving a first designated voltage, and a second power terminal for receiving a second designated voltage from the electronic device, and one or more signal terminals for connecting the electronic device, wherein the first power terminal is disposed in a first region of at least one surface of the housing to correspond to a power terminal of a UICC, and the second power terminal is disposed in a second region of the at least one surface of the housing to correspond to a power terminal of an SD card.

In accordance with another aspect of the disclosure, an electronic device is provided. The electronic device includes a connector for mounting at least one of a universal flash storage (UFS) card, a secure digital (SD) card, or a universal integrated circuit card (UICC). The connector includes a first power terminal for connecting the SD card or the UFS card, a second power terminal for connecting the UFS card or the UICC, and one or more signal terminals for connecting at least one of the UFS card, the SD card, and the UICC, and at least one processor. The at least one processor is configured to output a second designated voltage through the second power terminal, identify the card based on a response from the card, if identifying the card as the UICC, reset the UICC through the one or more signal terminals, and if the card does not correspond to the UICC, output a third designated voltage of a higher level than the second designated voltage through the second power terminal.

In accordance with another aspect of the disclosure, a method of an electronic device is provided. The method includes, connecting to one of a UFS card, an SD card, and a UICC, detecting a card mounted in a connector of the electronic device, if the card corresponds to the UFS card, outputting to the UFS card a first designated voltage through the first power terminal and a second designated voltage through the second power terminal, resetting the UFS card through the one or more signal terminals, and if the card does not correspond to the UFS card, outputting the first designated voltage through the first power terminal and a third designated voltage through the second power terminal, and resetting a corresponding one of the SD card and the UICC through the one or more signal terminals.

In accordance with another aspect of the disclosure, a method of an electronic device is provided. The method includes, connecting to one of a UFS card, an SD card, and a UICC, outputting a second designated voltage through a second power terminal for connecting the UFS card or the UICC, identifying the card based on a response from the card, resetting the UICC through the one or more signal terminals if the card is identified as the UICC, and outputting a third designated voltage of a higher level than the second designated voltage through the second power terminal if the card does not correspond to the UICC.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
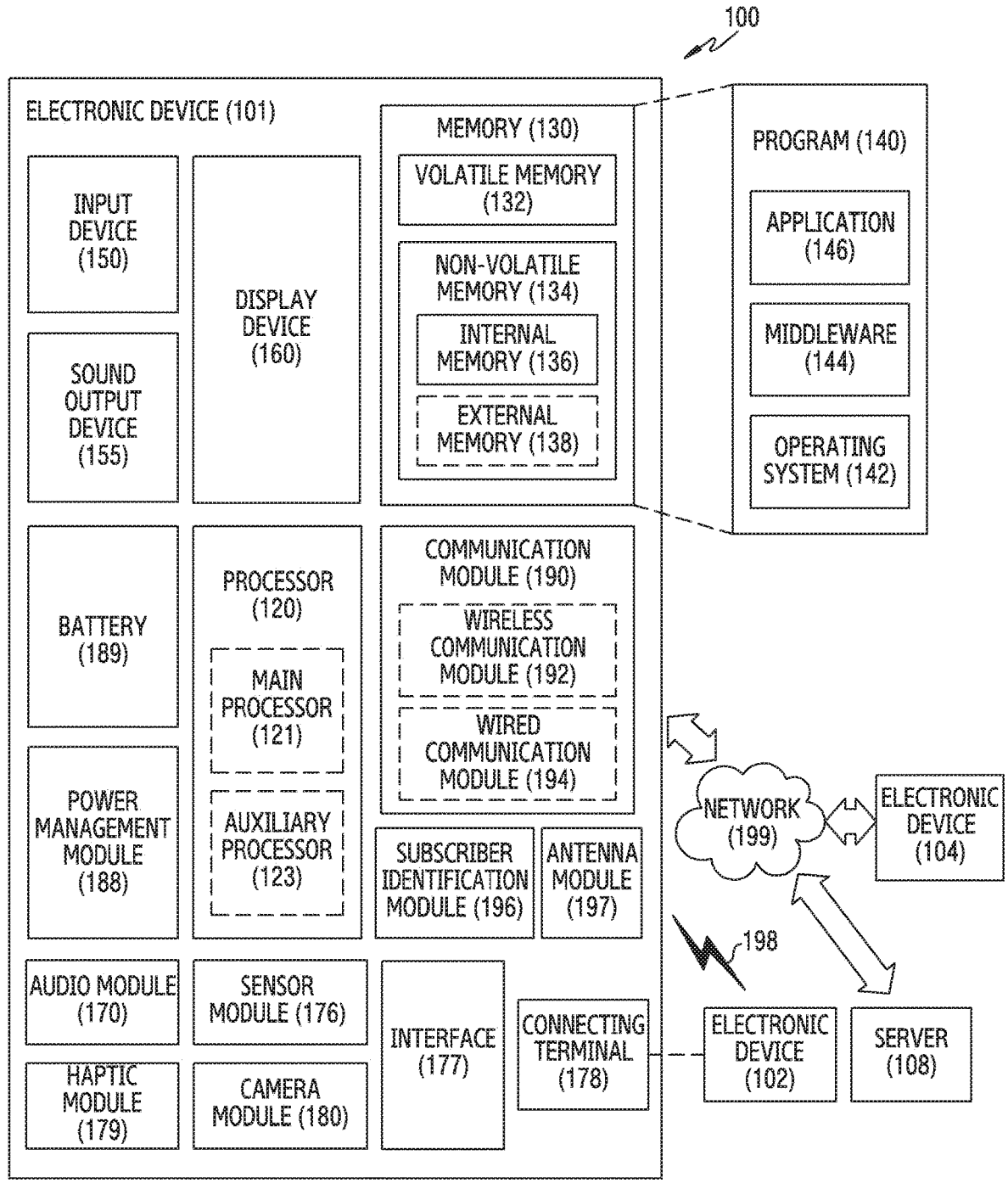
FIG. 1 illustrates a block diagram of an electronic device capable of connecting to various external memory devices according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., printed circuit board (PCB)). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
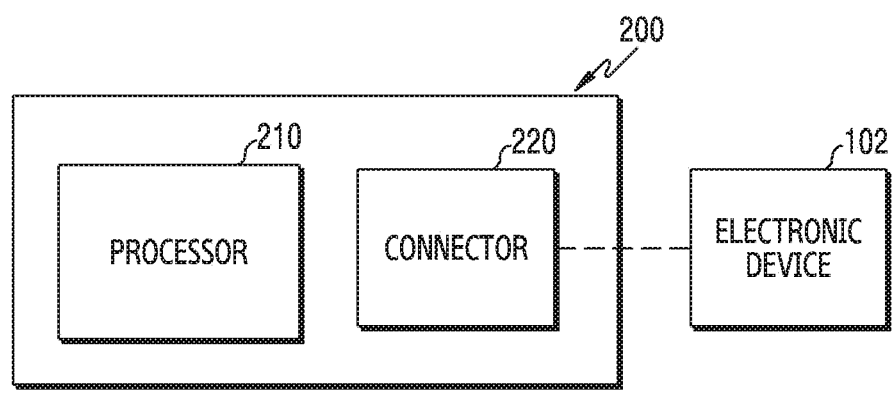
FIG. 2A illustrates an example of an electronic device capable of connecting to various types of a memory device according to an embodiment of the disclosure.

FIG. 2A illustrates an example of an electronic device 200 (e.g., the electronic device 101 shown in FIG. 1) capable of connecting to various types of a memory device according to an embodiment of the disclosure.

Referring to FIG. 2A, the electronic device capable of connecting to various memory devices includes a processor 210 and a connector 220.

The connector 220 is an example of the connecting terminal 178 of FIG. 1, and may physically connect the electronic device 200 with an external electronic device 102 (e.g., a memory device). The connector 220 may include at least one power terminal for driving the memory device to be described in FIG. 4, FIG. 5, and FIG. 6, and various signal terminals for transmitting and/or receiving signals between the memory device 102 and the electronic device 200. For example, the connector 220 may include at least one common connector including an SD card connector, a UICC connector, and a UFS card connector. For example, the connector 220 may include at least one power terminal and at least one signal terminal which are connected to at least one of an SD card, a UFS card, and a UICC.

According to various embodiments, the processor 210 may detect the memory device 102 connected through the connector 220 by driving, for example, software (e.g., the program 140) and drive the memory device 102 by supplying at least one designated voltage to the detected memory device 102 through at least one designated power terminal. For doing so, a power management module (e.g., PMIC) for driving the designated power according to a kind or a type of the memory device 102 may be integrated with the processor 210.

According to various embodiments, the processor 210 may, for example, select one or more of the power terminals for the detected electronic device, select at least one of voltage levels for the selected power terminal, and apply the selected voltage level. The processor 210 may first, for example, apply a low voltage level of at least one designated level to the memory device 102 connected through at least one designated power terminal of the connector 220, and thus detect the memory device 102 which responds. If no memory device 102 responds to the low voltage level, the processor 210 may apply a higher voltage level in sequence and thus detect the responding memory device 102.

The processor 210 may reset the memory device 102 which is driven with the power, and receive data stored in the memory device 102 or transmit data to store to the memory device 102 by transceiving control signals. By transceiving the control signals, the processor 120 may control at least one other component (e.g., hardware or software component) of the memory device 102, and process various data and operations. The processor 210 may receive data stored in the memory device 102 and thus control the memory device 102. The processor 210 may store various data which is generated in the operations of the electronic device 200 or received over a network, in the memory device 102 connected through the connector 220.

Figure 2B:
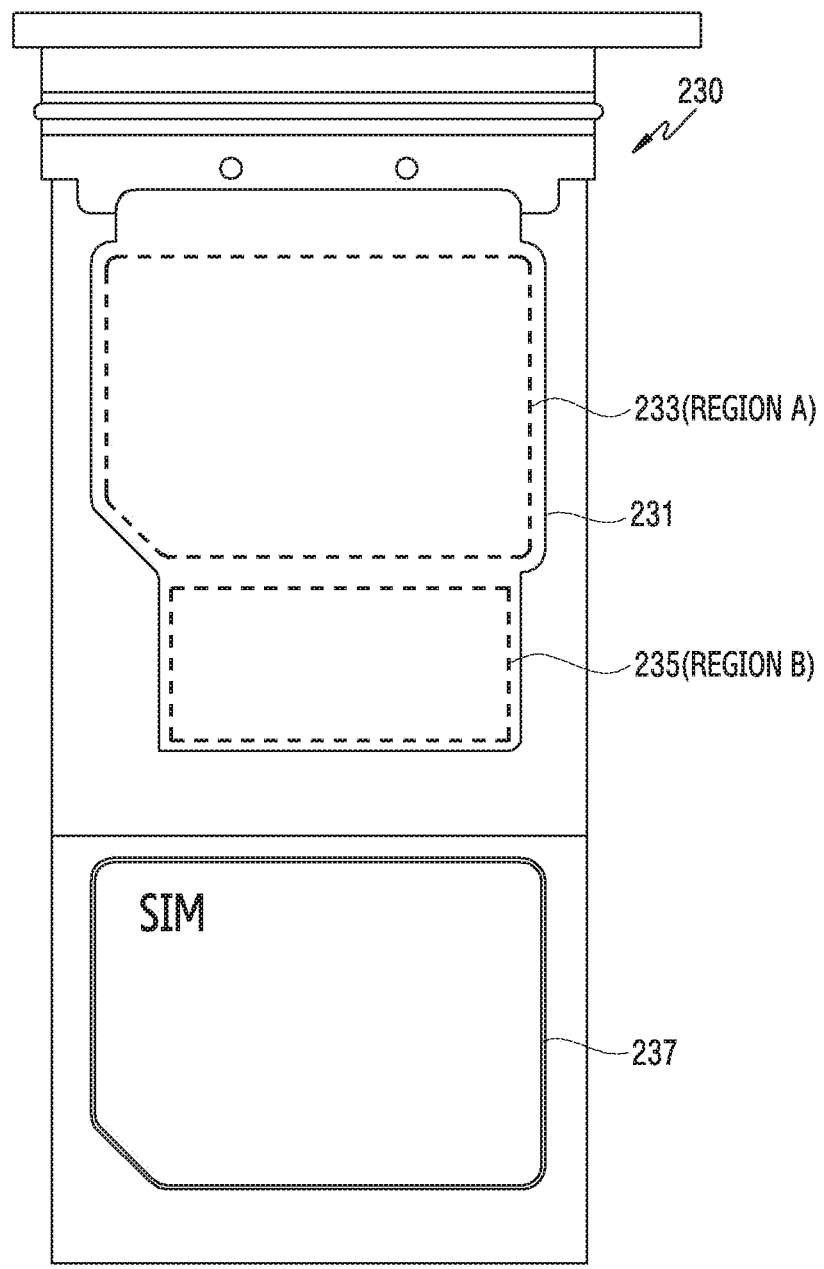
FIG. 2B illustrates an example of a housing of an electronic device capable of mounting various memory devices according to an embodiment of the disclosure.

FIG. 2B illustrates an example of a housing 230 of an electronic device (e.g., the electronic device 101 or 200) capable of mounting various types of a memory device according to an embodiment of the disclosure.

Figure 4:
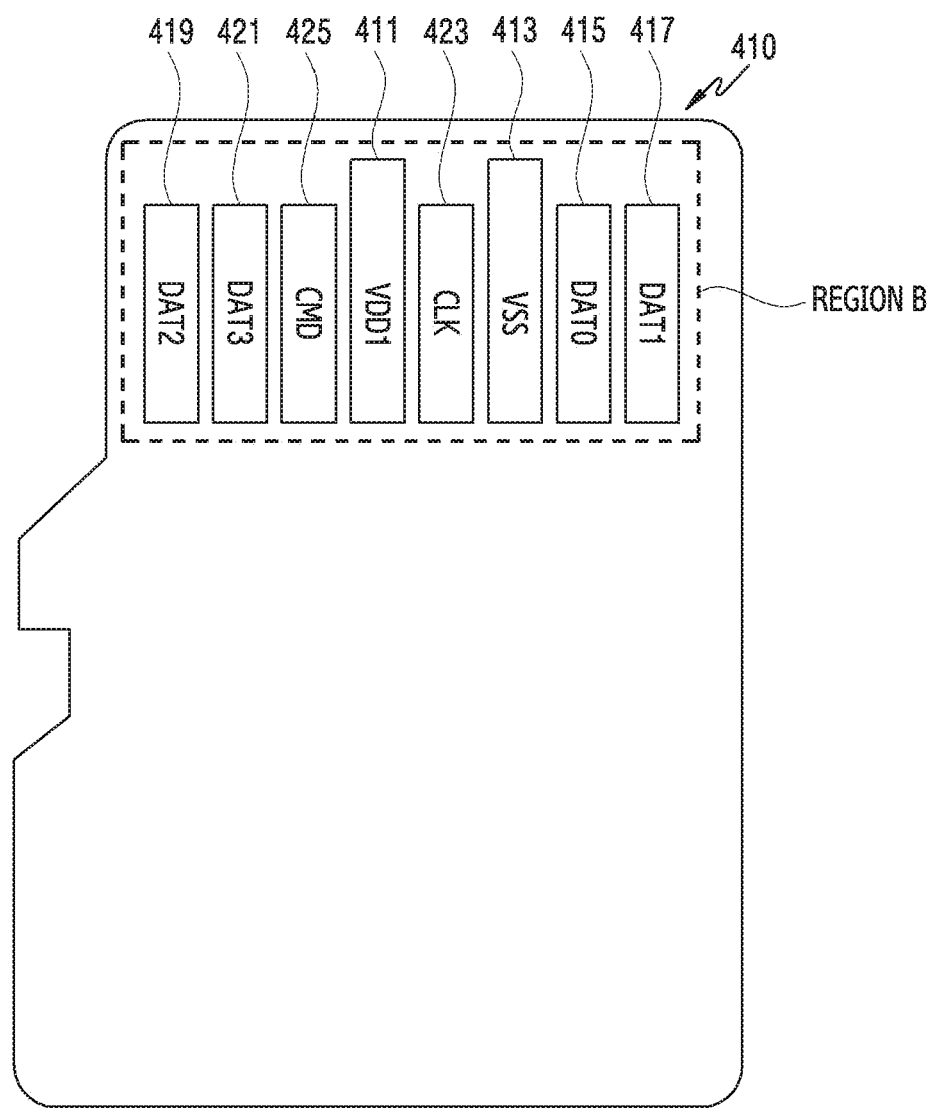
FIG. 4 illustrates an example of a memory device of various types connected to an electronic device according to an embodiment of the disclosure.
Figure 5:
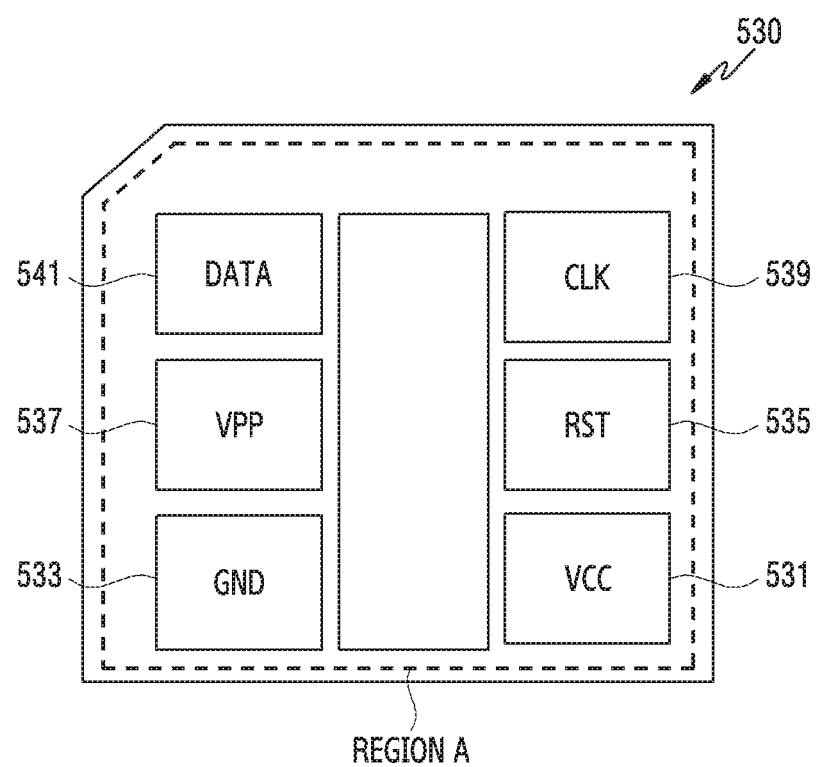
FIG. 5 illustrates another example of a memory device of various types connected to an electronic device according to an embodiment of the disclosure.
Figure 6:
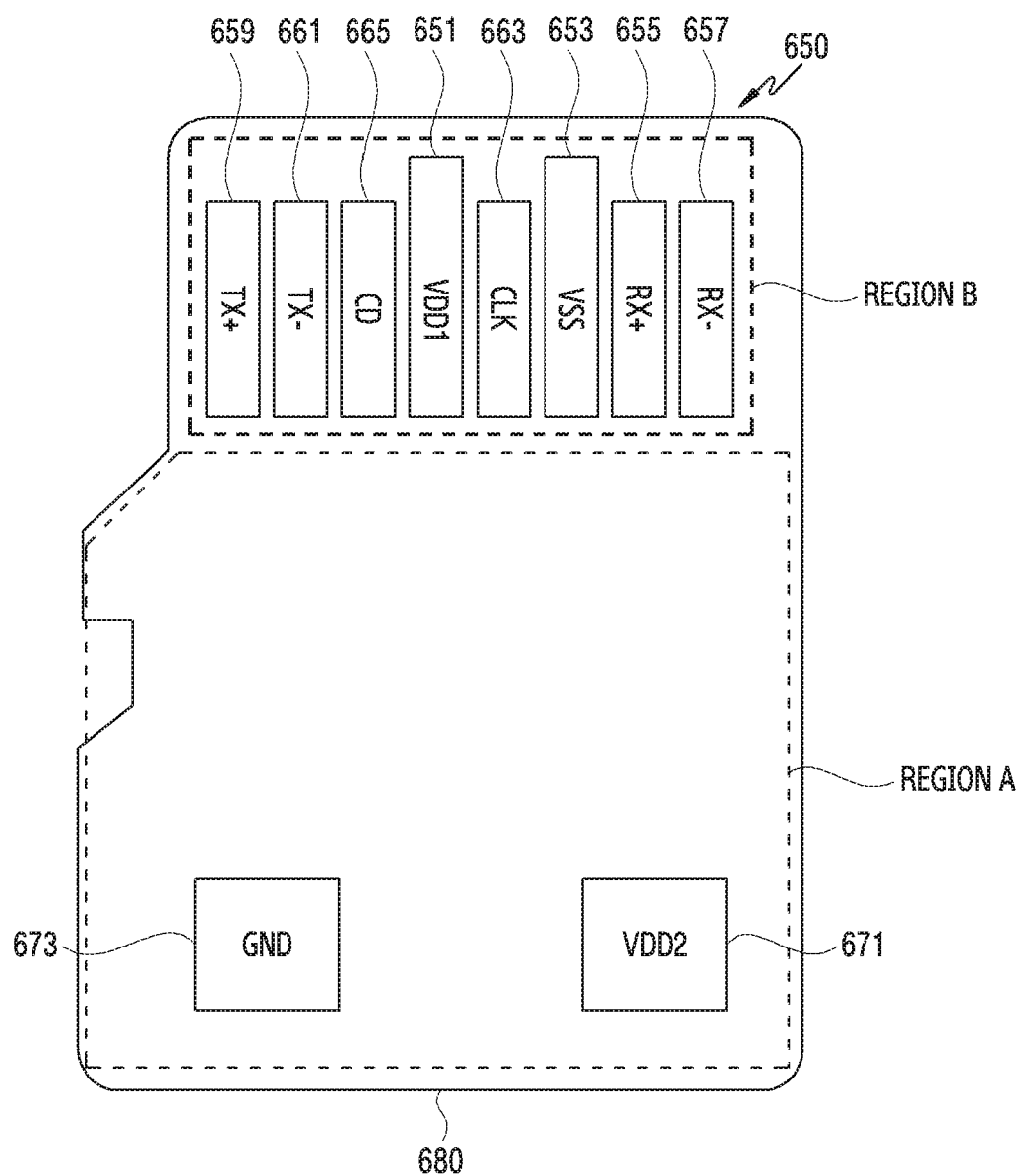
FIG. 6 illustrates yet another example of a memory device of various types connected to an electronic device according to an embodiment of the disclosure.

The housing 230 may selectively mount one or more of various memory devices 102, for example, an SD card, a UICC (e.g., subscriber identification module (SIM) card), and a UFS card to be described in FIG. 4, FIG. 5, and FIG. 6. A shape of the housing 230 is not limited to this, and may change to receive various types of the memory device. The housing 230 is, for example, an example of the structure for, if at least one of the SD card, and the UICC, and the UFS card is mounted and coupled to the electronic device, connecting the mounted card to a common connector (not shown) including an SD card connector, a UICC connector, and a UFS card connector.

The connector 220 may connect the memory device 102 mounted in the housing 230 with the electronic device 200 through two or more power terminals and signal terminals. The memory device 102 mounted in the housing 230 may be inserted into an inserting portion (not shown) for accommodating the housing 230 of the electronic device 200 and contact with the power terminals and the signal terminals of the connector 220. For doing so, the power terminals and the signal terminals of the connector 220 may be disposed at positions corresponding to connecting terminals of the memory device 102 mounted in the housing 230 and inserted to the inserting portion.

Referring to FIG. 2B, if the housing 230 is separated from the electronic device 200, it is separated from the power terminals and the signal terminals. If the memory device 102 is mounted in the housing 230 and the housing 230 is inserted into the electronic device 200, the memory device 102 mounted in the housing 230 may physically connect to at least part of the power terminals and at least part of the signal terminals of the connector 220, according to its type. For example, the connector 220 may include at least one power terminal and at least one signal terminal for connecting to at least one of the SD card, the UFS card, and the UICC. The connector 220 may drive the SD card, the UFS card, or the UICC mounted in the housing 230 and inserted to the electronic device 200 by applying the power through the at least one power terminal, and perform communication by connecting through the at least one signal terminal.

If the memory device 102 is mounted in the housing 230 and inserted into the electronic device 200, the connecting terminals of the memory device 102, which are defined according to a structure or a standard of the memory device 102, may be connected with at least one power terminal and at least one signal terminal of the connector 220 of the electronic device 200.

The housing 230 of FIG. 2B includes a first housing 231 for mounting the SD card, the UFS card, and the UICC, and a second housing 237 for mounting the UICC, but not limited to, in series. For example, the housings may be deposited above and below in parallel, or may be connected to separate connectors at separate positions. Now, a structure for mounting and driving various cards in the first housing 231 is illustrated, and a structure of the second housing 237 may be similar to the structure of the first housing 231. For the sake of convenience, the first housing 231 may be referred to as the housing 231.

If the UICC (e.g., a SIM card) is mounted in the housing 231 and connected to the electronic device 200, the UICC may be mounted to expose a power terminal and signal terminals disposed on one of its surfaces toward at least part (e.g., a region A 233) of one of surfaces of the housing 231. Hence, the power terminal and the signal terminals of the UICC may be configured to contact and connect to corresponding power terminal and signal terminals of the connector 220 in at least some region (e.g., the region A 233) of the housing 231.

If the SD card is mounted in the housing 231 and connected to the electronic device 200, the SD card may be mounted to expose a power terminal and signal terminals disposed in at least part of one of its surfaces toward at least part (e.g., a region B 235) of one of the surfaces of the housing 231. Hence, the power terminal and the signal terminals of the SD card may be configured to contact and connect to corresponding power terminal and signal terminals of the connector 220 in at least some region (e.g., the region B 235) of the housing 231.

If the UFS card is mounted in the housing 231 and connected to the electronic device 200, the UFS card may be mounted to expose a power terminal and signal terminals disposed in at least part of one of its surfaces toward at least part (e.g., the region A 233 and/or the region B 235) of one of the surfaces of the housing 231. Hence, the power terminal and the signal terminals of the UFS card may be configured to contact and connect to corresponding power terminal and signal terminals of the connector 220 in at least some region (e.g., the region A 233 and/or the region B 235) of the housing 231.

According to various embodiments, at least part of other components of the connector 220, for example, at least part of the power terminals and the signal terminals may be included in the housing 231. In this case, if the memory device 102 is mounted even with the housing 231 separated from the electronic device 200, it may contact at least the power terminal or the signal terminal of the housing 231. Meanwhile, the power terminals and the signal terminals of the connector 220 may be disposed at corresponding positions to contact the connecting terminals of the memory device while the housing 231 including the mounted memory device is inserted into the electronic device 200.

The connector 220 may include at least one common power terminal for applying common power to the memory device 102 of two or more types. For example, the connector 220 may include a first power terminal for connecting to the SD card and the UFS card, and the SD card or the UFS card mounted in the housing 231 may be connected to the first power terminal. In this case, the first power terminal may be configured to apply the power by contacting the SD card or the UFS card in, for example, the region B 235 of the housing 231. For example, the connector 220 may include a second power terminal for connecting to the UFS card and the UICC, and the UFS card or the UICC mounted in the housing 231 may be connected to the second power terminal. In this case, the second power terminal may be configured to apply the power by contacting the UFS card or the UICC in, for example, the region A 233 of the housing 231.

The connector 220 may include at least one common signal terminal for commonly connecting to the memory device 102 of two or more types. For example, the connector 220 may include at least one common signal terminal for commonly connecting the SD card and the UFS card, and the SD card or the UFS card mounted in the housing 231 may transmit and receive signals to and from the electronic device 200 through the common signal terminal. In this case, the common signal terminal which is commonly connected to the SD card and the UFS card may be connected to the electronic device 200 to contact and connect the SD card or the UFS card in, for example, the region B 235 of the housing 231. For example, the connector 220 may include at least one common signal terminal for commonly connecting the UFS card and the UICC, and the UFS card or the UICC mounted in the housing 231 may transmit and receive signals to and from the electronic device 200 through the at least one common signal terminal. In this case, the common signal terminal which is commonly connected to the UFS card and the UICC may be connected to the electronic device 200 to contact and connect the UFS card or the UICC in, for example, the region A 233 of the housing 231.

While the detachable housing 230 for accommodating the connector 220 and the memory device 102 is the separate component in FIG. 2B, the connector 220 according to various embodiments may be configured to fix the housing 230 inside the electronic device 200 and to accommodate the memory device 102. In this case, the power terminals and the signal terminals may be integrated without being separated from the housing 230.

In FIG. 2B, the housing 230 includes the housing 231 for selectively mounting various types of the memory device 102 and the housing 237 for mounting the UICC as mentioned above. According to various embodiments, the structure of the housing 230 is not limited to these, and may include a plurality of housings of various structures. For example, the housing 230 may include a plurality of housings of the same structure as the housing 231, or may further include the housing 237 of the different structure with the housing 231 as shown in FIG. 2B.

Figure 3:
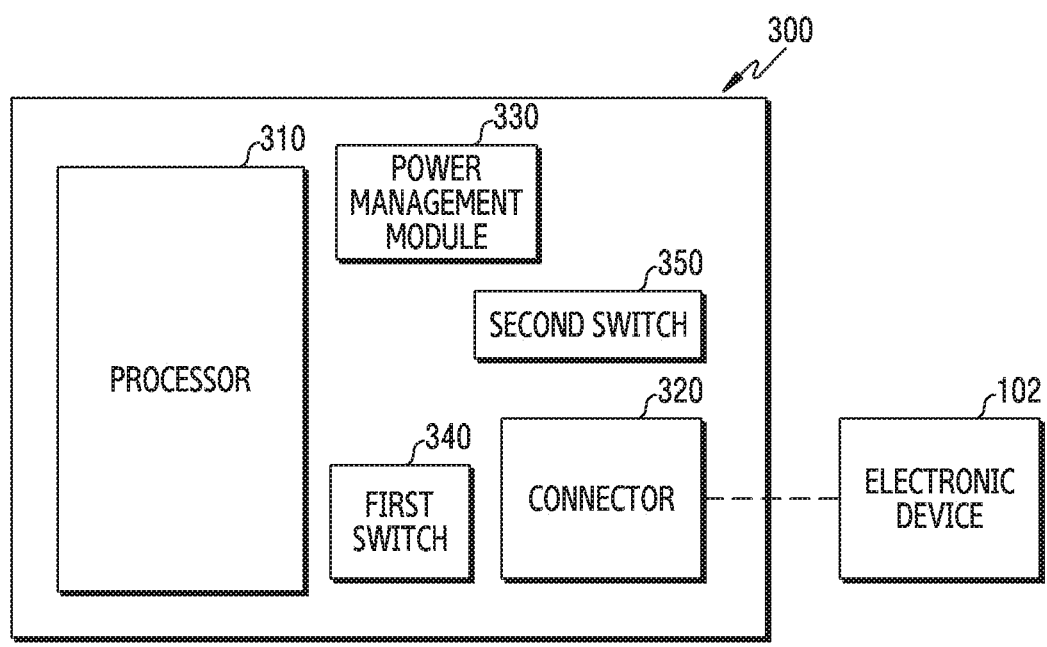
FIG. 3 illustrates another example of an electronic device capable of connecting to various external memory devices according to an embodiment of the disclosure.

FIG. 3 illustrates another example of an electronic device capable of connecting to various external memory devices according to an embodiment of the disclosure.

Referring to FIG. 3, an electronic device 300 (e.g., the electronic device 101 or the electronic device 200) capable of connecting to various types of a memory device includes a processor 310 (e.g., the processor 120) and a connector 220 (e.g., a connector 220).

The connector 320 may include at least one power terminal for driving memory devices to be explained in FIG. 4, FIG. 5, and FIG. 6, and various signal terminals for transmitting and/or receiving signals between an external device 102 (e.g., the memory device) and the electronic device 300. The connector 320 may include at least one common connector including an SD card connector, a UICC connector, and a UFS card connector. For example, the connector 320 may include at least one housing 230 as mentioned in FIG. 2B, and may include at least one power terminal and at least one signal terminals for connecting to the memory device 102. The connector 320 may include the housing 230 and the housing 237 as described in FIG. 2B, and may include at least one power terminal and at least one signal terminal for contacting and connecting to the plurality of the memory devices 102.

The electronic device 300 may further include a power management module 330. The power management module 330 may be configured as, for example, at least part of a PMIC. The power management module 330 may be configured as part of, for example, the processor 310. The power management module 330 may supply a designated voltage level through a designated power terminal under control of the processor 310, according to the type of the detected memory device 102.

According to various embodiments, the processor 310 may identify the memory device 102 connected to the processor 310 through the connector 320 by driving, for example, software (e.g., the program 140), and drive the memory device 102 by controlling the power management module 330 to supply the designated driving power to the identified memory device through at least one designated power terminal.

If necessary, the electronic device 300 may further include a second switch 350. In this case, the processor 310 may operate the second switch 350 according to, for example, the detected memory device 102 to selectively supply different voltages through the same power terminal.

According to various embodiments, the processor 310 may control the power management module 330 by driving, for example, software (e.g., the program 140), to apply a voltage of at least one designated level to the memory device 102 connected to the processor 310 through at least one designated power terminal of the connector 320, and thus detect the memory device 102. The processor 310 may operate, for example, the second switch 350 to apply a low voltage level of designated levels to at least one designated power terminal, and thus detect the memory device 102 which responds to the low voltage level. The processor 310 may, for example, first apply a low voltage level of at least one designated level to the memory device 102 connected to the processor 310 through at least one designated power terminal, and thus detect the memory device 102 which responds to it. If no memory device 102 responds to the low voltage level, the processor 310 may apply a higher voltage in sequence and thus detect the responding memory device 102.

The processor 310 may reset the memory device 102 by transmitting a signal to the memory device 102 which is driven with the supplied power, through at least one signal terminal of the connector 320. If the memory device 102 is reset, the processor 310 may process various data and operations by controlling at least one other component (e.g., hardware or software component) of the memory device 102. The processor 310 may control the electronic device 300 by receiving data stored in the memory device 102. The processor 310 may store various data which is generated in operations of the electronic device 300 or received over a network, in the memory device 102 connected through the connector 220.

For doing so, if necessary, the electronic device 300 may further include a first switch 340. In this case, the processor 310 may operate the first switch 340 according to the detected memory device 102 to transmit and/or receive signals in different standards through the same signal terminal.

The electronic device according to various embodiments may be one of various types of electronic devices. The electronic devices may include at least one of, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., a computer). The machine may invoke an instruction stored in the storage medium and operate according to the invoked instruction, and may include an electronic device (e.g., the electronic device 101, the electronic device 202, or the electronic device 300) according to the embodiments. If the instruction is executed by a processor (e.g., the processor 120, the processor 210, or the processor 310), the processor may execute a function corresponding to the instruction, with or without using one or more other components under the control of the processor. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as a memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 4 illustrates an example of a memory device of various types connected to an electronic device according to an embodiment of the disclosure. FIG. 4 illustrates an SD card 410 as an example of the external electronic device 102 (e.g., the memory device) of FIG. 2 or FIG. 3.

Referring to FIG. 4, the SD card 410 includes an interface for connecting to the electronic device 200 or 300. The interface includes a power terminal and signal terminals in a region (a region B) of one of two surfaces of the SD card 410.

The region (the region B) including the power terminal and the signal terminals of the SD card 410 may correspond to the region B 235 of the housing 230 of FIG. 2B. The SD card 410 may be mounted in the housing 230 and connected to the electronic device 200 through a power terminal and signal terminals of the connector 220 which are disposed to contact the power terminal and the signal terminals of the SD card 410 one to one in the region B 235 of the housing 230.

For example, the SD card 410 may include a VDD1 terminal 411 and a VSS terminal 413 to apply power. The SD card 410 may include DAT0, DAT1, DAT2, and DAT3 terminals 415 through 421, for data signal input or output. The SD card 410 may include a CLK terminal 423 for clock signal input, and a CMD terminal 425 for control signal input.

FIG. 5 illustrates another example of a memory device of various types connected to an electronic device according to an embodiment of the disclosure. FIG. 5 illustrates a UICC 530 as an example of the external electronic device 102 (e.g., the memory device) of FIG. 2 or FIG. 3.

Referring to FIG. 5, the UICC 530 includes an interface for connecting to the electronic device 200 or 300. The interface includes a power terminal and signal terminals in a region (a region A) of one of two surfaces of the UICC 530. The region (the region A) including the power terminal and the signal terminals of the UICC 530 may correspond to the region A 233 of the housing 230 of the connector 220 of FIG. 2B. The UICC 530 may be mounted in the housing 230 and connected to the electronic device 200 through a power terminal and signal terminals of the connector 220 which are disposed to contact the power terminal and the signal terminals of the UICC 530 one to one in the region A 233 of the housing 230 of the connector 220.

For example, the UICC 530 may include a VCC terminal 531 and a GND terminal 533. The UICC 530 may include an RST terminal 535 for resetting the card, and a CLK terminal 539 for a clock signal. The UICC 530 may include a VPP terminal 537. The UICC 530 may include a DATA terminal 541 for inputting or outputting a data signal.

FIG. 6 illustrates yet another example of a memory device of various types connected to an electronic device according to various an embodiment of the disclosure. FIG. 6 illustrates a UFS card 650 as an example of the external electronic device 102 (e.g., the memory device) of FIG. 2 or FIG. 3.

Referring to FIG. 6, the UFS card 650 includes a housing 680 which is mounted in the connector 220 of the electronic device 200 or 300, and an interface for connecting to the electronic device 200 or 300.

The housing 680 may have a shape mounted in the housing 230 of the connector 220 of the electronic device 200 or 300, and include a power terminal and signal terminals for connecting to the connector 220 on at least one surface. For example, as shown in FIG. 6, the UFS card 650 may include the power terminal and the signal terminals in, for example, one region (region A) and other region (region B) of one surface of the housing 680.

The interface includes the power terminal and the signal terminals in the housing 680, and may include various hardware and software for connecting the electronic device 200 or 300 and the UFS card 650 for communication.

The one region (region A) and the other region (region B) including the power terminal and the signal terminals may be separated from each other over a designated distance. Alternatively, the power terminal and the signal terminals of the one region (region A) and the other region (region B) may be separated from each other over the designated distance. Among the terminals of the UFS card 650, the terminals corresponding to the SD card and the terminals corresponding to the UICC may be disposed physically separately, thus preventing damage of the terminal due to short or physical damage even if different cards are inserted to the connector 220.

The one region (region A) including the power terminal and the signal terminals of the UFS card 650 may correspond to the region A 233 of the housing 230 of the connector 220 of FIG. 2B. If the UFS card 650 is mounted in the housing 230 of the connector 220, the terminals in the region A of the UFS card 650 may be configured to connect, at the same positions, to at least some terminals of the connector 220 to which at least part of the terminals of the one region (region A) of the UICC 530 as described in FIG. 5 are connected. For example, the UFS card 650 may include a VDD2 terminal 671 and a GND terminal 673 to apply the power. The VDD2 terminal 671 of the UFS card 650 may be connected to the power terminal of the connector 220 at the same position as the VCC terminal 531 of the UICC 530. The GND terminal 673 of the UFS card 650 may be connected to the terminal of the connector 220 at the same position as the GND terminal 533 of the UICC 530.

The one region (region A) including the power terminal and the signal terminals of the UFS card 650 may correspond to the region B 235 of the housing 230 of the connector 220 of FIG. 2B. If the UFS card 650 is mounted in the housing 230 of the connector 220, the terminals of the region B of the UFS card 650 may be configured to connect, at the same positions, to at least some terminals of the connector 220 to which at least part of the terminals of the one region (region B) of the SD card 410 as described in FIG. 4 are connected. For example, the UFS card 650 may include a VDD1 terminal 651 and a VSS terminal 653 to apply the power. The VDD1 terminal 651 of the UFS card 650 may be connected to the power terminal of the connector 220 at the same position as the VDD1 terminal 411 of the SD card 410. The VSS terminal 653 of the UFS card 650 may be connected to the corresponding terminal of the connector 220 at the same position as the VSS terminal 413 of the SD card 410. The UFS card 650 may include RX+ and RX− terminals 655 and 657 for receiving a data signal, and TX+ and TX− terminals 659 and 661 for transmitting a data signal. The RX+ and R− terminals 655 and 657 of the UFS card 650 may be connected to the corresponding terminals of the connector 220 at the same positions as the DAT0 and DAT1 terminals 415 and 417 of the SD card 410. The TX+ and TX− terminals 659 and 661 of the UFS card 650 may be connected to the corresponding terminals of the connector 220 at the same positions as the DAT2 and DAT3 terminals 419 and 421 of the SD card 410. The UFS card 650 may include a CLK terminal 663 for clock signal input. The CLK terminal 663 of the UFS card 650 may be connected to the corresponding terminal of the connector 220 at the same position as the CLK terminal 413 of the SD card 410. The UFS card 650 may include a CD terminal 665 for detecting the card. The CD terminal 665 of the UFS card 650 may be connected to a corresponding terminal of the connector 220 at the same position as the CMD terminal 425 of the SD card 410, and used for the processor 120, 210, or 310 of the electronic device 101, 200, or 300 to detect the UFS card 410. The CD terminal 665 may be used to identify the type of the memory device. The CD terminal 665 may be used to identify whether the memory device is a UFS card. The CD terminal 665 may be used to identify whether the memory device is a UFS card or an SD card.

FIG. 7 through FIG. 14 illustrate operations of an electronic device 101, 200, or 200 and a memory device 102, 410, 530, or 650 according to various embodiments of the disclosure, and elucidate the operations with at least one of the electronic device and the memory of FIG. 1 through FIG. 6.

Figure 7:
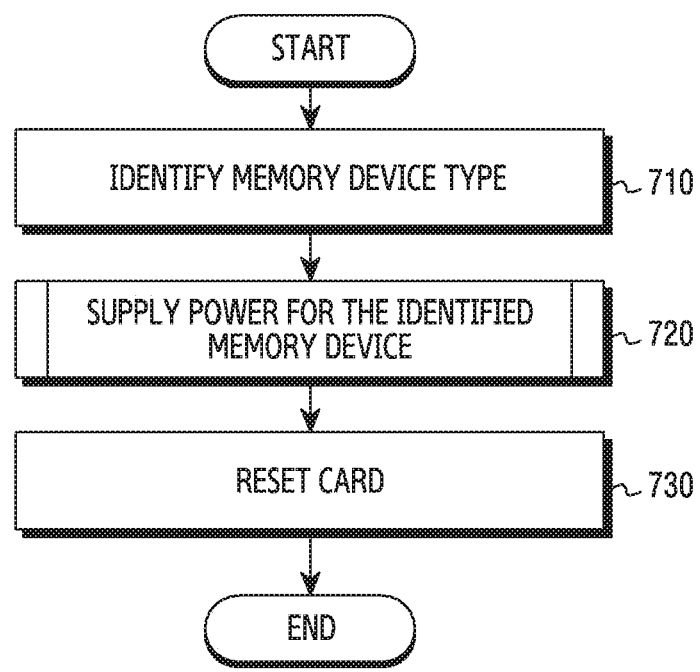
FIG. 7 illustrates an example of connecting an electronic device to various types of a memory device according to an embodiment of the disclosure.

Referring to FIG. 7, an example of connecting an electronic device with various types of a memory device according to various embodiments. According to various embodiments, the processor 120, 210, or 310 of the electronic device 101, 200, or 200 identifies other electronic device, an external electronic device, an external memory, or the memory device 102, 410, 530, or 650 in operation 710. For example, the electronic device may identify the type of the memory device. The type of the memory device includes, for example, a UICC, a UFS card, an SD card, and so on.

The electronic device may identify whether the memory device is, for example, the UFS card, by driving the processor 120, 210, or 310. The processor may identify whether the memory device is the UFS card, using the terminal of the connector 220 or 320 of the electronic device corresponding to the terminal of the CMD 425 or the CD 665 of FIG. 5 or FIG. 6. For example, the processor may identify a signal level received through the terminal of the connector corresponding to the CMD terminal 425 or the CD terminal 665, and identify that the memory device is the UFS card if the identified signal level is low. In this case, the processor may identify that the memory device is not the UFS card if the identified signal level is high.

The electronic device may detect the memory device if the connection to the memory device commences. For example, the electronic device may detect the memory device if the electronic device is booted or rebooted, if the memory device is booted or rebooted, if the memory device is inserted into the electronic device.

The processor may drive power for the identified card in operation 720. The processor may drive the power for the identified card by applying a designated voltage level in a designated pattern through designated power terminals for a corresponding type, according to the type of the identified memory device.

For example, based on identifying that the memory device is the UFS card, the processor may drive the power for the UFS card. The processor may apply a designated voltage level for the UFS card through corresponding power terminals. According to various embodiments, the processor may apply the voltage of the designated level through the VDD1 terminal 651 and the VDD2 terminal 671 of the UFS card 650 of FIG. 6. The processor may apply different voltage levels through the VDD1 terminal 651 and the VDD2 terminal 671 of the UFS card 650. For example, the processor may apply (ramp up) the voltage over 3.0V through the VDD1 terminal 651, and apply the voltage over 1.5V through the VDD2 terminal 671. For example, the processor may drive the power to maintain the voltage level about 3.0V applied through the VDD1 terminal 651 of the UFS card 650 and to maintain the voltage level about 1.8V applied through the VDD2 terminal 671.

For example, the processor may drive power for the SD card and/or the UICC based on identifying that the memory device is not the UFS card. The processor may apply a designated voltage level for the SD card through a corresponding power terminal. The processor may apply a designated voltage level for the UICC card through a corresponding power terminal. For example, the processor may sequentially ramp up the power level to maintain, for example, the voltage about 2.7V through about 3.3V through the VDD1 terminal 411 of the SD card 410 of FIG. 4. Based on the response of the UICC 530, the processor may change the voltage level from a low voltage level (e.g., about 1.62V to about 1.98V) corresponding to a class C to a high voltage level (e.g., about 2.7V to about 3.3V or about 4.5V to about 5.5V) corresponding to a class B or a class A according the UICC class, through the VCC terminal 531 of the UICC 530 of FIG. 5. For doing so, the processor may apply the low voltage level (e.g., about 1.62V to about 1.98V) through the VCC terminal 531, and if receiving no response from the UICC 530, sequentially ramp up the voltage level to the high voltage level (e.g., about 2.7V to about 3.3V or about 4.5V to about 5.5V) until a response is received from the UICC 530.

The processor may apply the voltage over about 1.5V through the VDD2 terminal 671. For example, the processor may drive the power to maintain the voltage level about 3.0V applied through the VDD1 terminal 651 of the UFS card 650, and drive the power to maintain the voltage level about 1.8V applied through the VDD2 terminal 671.

If driving the power for the identified memory device, the processor may reset the corresponding memory device in operation 730. If the power for the memory device is stabilized, the processor may release, for example, a high reset signal level. Hence, the processor may drive the memory device by transceiving control signals with the memory device, and transceive data.

Figure 8:
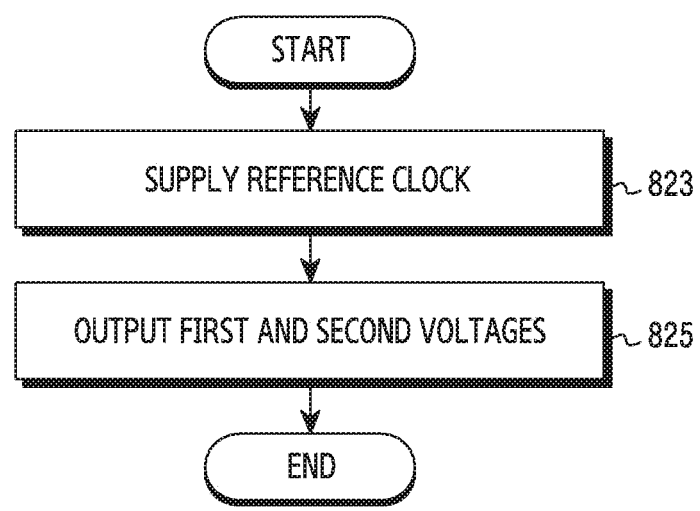
FIG. 8 illustrates an example of driving various types of a memory device in an electronic device according to an embodiment of the disclosure.

FIG. 8 illustrates an example of driving various types of a memory device 102, 410, 530, or 650 in an electronic device according to an embodiment of the disclosure. According to various embodiments, if the memory device 102, 410, 530, or 650 is identified as, for example, the UFS card 650 as shown in FIG. 6, the processor 120, 210, or 310 may drive power for the UFS card, based on identifying that the memory device is the UFS card. Operations 823 and 825 of FIG. 8 may be related to operation 720 of FIG. 7.

Referring to FIG. 8, the processor may supply reference clock REF_CLK to the memory device in operation 823. For example, the processor may apply the reference clock REF_CLK of a designated level to the memory device through the CLK terminal 663 of FIG. 6.

As applying the reference clock REF_CLK, the processor may output a first voltage and a second voltage in operation 825. In so doing, the processor may determine a designated voltage level for driving the UFS card and apply a corresponding voltage. For example, the processor may individually apply the first voltage and the second voltage of different levels through two separate power terminals. For example, the processor may individually apply the first voltage and the second voltage of the designated level range through the VDD1 terminal 651 and the VDD2 terminal 671 of the UFS card 650 of FIG. 6. For example, the processor may ramp up the first voltage to output the voltage over 3.0V through the VDD1 terminal 651, and ramp up the second voltage to output the voltage over 1.5V through the VDD2 terminal 671. For example, the processor may drive the power to maintain the first voltage level about 3.0V applied through the VDD1 terminal 651 of the UFS card 650, and drive the power to maintain the second voltage level about 1.8V applied through the VDD2 terminal 671.

Figure 9:
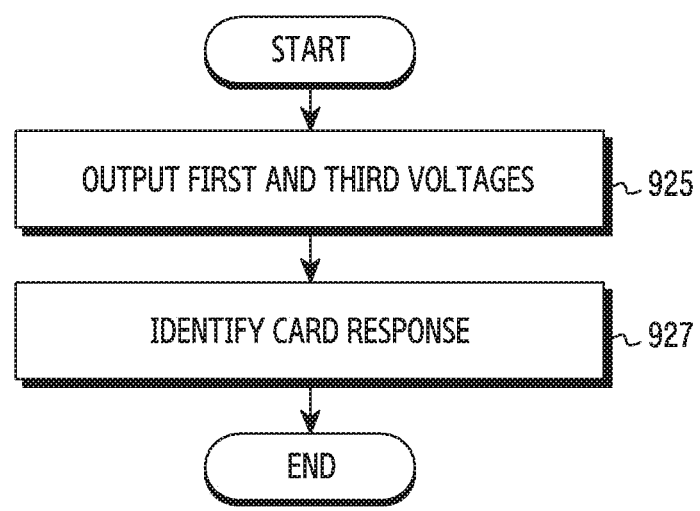
FIG. 9 illustrates another example of driving various types of a memory device in an electronic device according to an embodiment of the disclosure.

FIG. 9 illustrates an example of driving various types of a memory device 102, 410, 530, or 650 in an electronic device according to an embodiment of the disclosure. Operations 925 and 927 of FIG. 9 may be related to operation 720 of FIG. 7.

Referring to FIG. 9, in operation 925, the processor 120, 210 or 310 may output a first voltage of a designated level for the SD card and a third voltage of a designated level for the UICC, based on identifying that the memory device is not the UFS card. That is, the processor may apply the first voltage of the designated level for the SD card through a corresponding power terminal. The processor may apply the third voltage of the designated level for the UICC through a corresponding power terminal.

In operation 927, the processor may identify a response of the corresponding memory device while outputting the first voltage and the third voltage. For example, the processor may output the first voltage by sequentially ramping up the power level to maintain the voltage of, for example, 2.7V to 3.3V through the VDD1 terminal 411 of the SD card 410 of FIG. 4, and identify whether a response is received from the SD card. For example, the processor may output the third voltage by sequentially ramping up the voltage level based on the response of the UICC 530, from a low voltage level (e.g., about 1.62V to about 1.98V) corresponding to the UICC class C to a high voltage level (e.g., about 2.7V to about 3.3V or about 4.5V to about 5.5V) corresponding to the class B or the class A according the UICC class, through the VCC terminal 531 of the UICC 530 of FIG. 5, and identify whether a response is received from the UICC at each level. In so doing, the processor may output the third voltage of the low level (e.g., about 1.62V to about 1.98V) through the VCC terminal 531, and if receiving no response from the UICC 530, sequentially ramp up the third voltage level to the high voltage level (e.g., about 2.7V to about 3.3V or about 4.5V to about 5.5V) until a response is received from the UICC 530.

Figure 10:
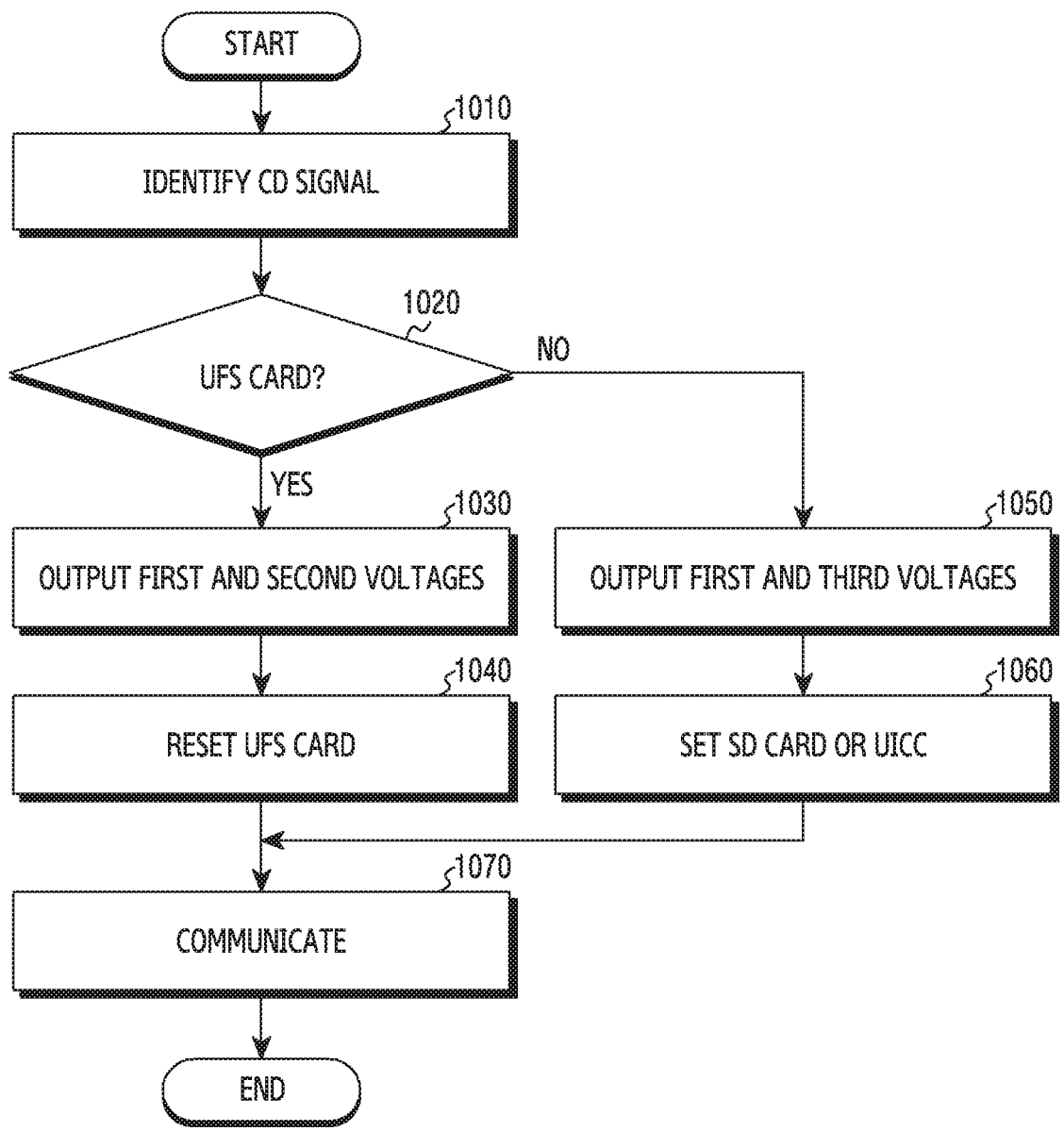
FIG. 10 illustrates another example of connecting an electronic device to a various types of a memory devices according to an embodiment of the disclosure.

FIG. 10 illustrates another example of connecting an electronic device 101, 200, or 300 with various types of a memory device 102, 410, 530, or 650 according to an embodiment of the disclosure.

Referring to FIG. 10, in operation 1010, the electronic device 101, 200, or 300 identifies a card detect (CD) signal received through the connection of the CMD terminal 425 or the CD terminal 665 of FIG. 5 or FIG. 6, with respect to the memory device 102, 410, 530, or 650 mounted in the connector 220 or 320 according to driving the processor 120, 210, or 310.

In operation 1020, the processor may identify whether a corresponding memory device is a UFS card, according to the CD signal level. For example, the processor may identify that the memory device is the UFS card if the CD signal level is low, and identify that the memory device is not the UFS card if the CD signal level is high.

If identifying the memory device is the UFS card, the processor may output first and second voltages while supplying reference clock REF_CLK of a designated level for the UFS card, in operation 1030. For example, the first voltage may be outputted through the VDD1 terminal 651 of the UFS card 650 of FIG. 6, and the second voltage may be outputted through the VDD2 terminal 671. The first voltage and the second voltage may be of different levels. For example, the processor may ramp up the voltage until the first voltage applied through the VDD1 terminal 651 reaches a designated level (e.g., 3.3V), and maintain a corresponding level. For example, the processor may ramp up the voltage until the second voltage applied through the VDD2 terminal 671 reaches a designated level (e.g., 1.8V), and drive the power to maintain a corresponding level.

As the first voltage and the second voltage are outputted and the UFS card is driven, the processor may reset the UFS card by releasing a high reset signal in operation 1040, and communicate with the UFS card by transceiving control signals in operation 1070.

Meanwhile, if the memory device is not the UFS card, the processor may output the first voltage of a designated level for the SD card and a third voltage of a designated level for the UICC in operation 1050. The processor may identify the memory device by outputting the first voltage and the third voltage, reset the SD card or the UICC in operation 1060, and communicate with the SD card or the UICC in operation 1070.

For example, the processor may apply a reset signal while maintaining the first voltage applied through the VDD1 terminal 411 of the SD card 410 of FIG. 4, below a specific level (e.g., 0.5V) for a specific time (e.g., 1 ms), and then gradually ramp up the first voltage up to a target level (e.g., 3.3V) at specific time intervals (e.g., 1 ms to 35 ms) to stay at the target level. Thus, the power is stabilized, and the processor may output a specific clock level (e.g., CLK 74) to the SD card and initiate communication by transmitting a control signal.

For example, the processor may output the third voltage which is sequentially ramped up from the third voltage of the low level (e.g., 1.62V to 1.98V) corresponding to the class C to the third voltage of the high level (2.7V to 3.3V or 4.5V to 5.5V) corresponding to the class B or the class A based on the UICC class, according to an answer to reset response of the UICC 530 through the VCC terminal 531 of the UICC 530 of FIG. 5, and identify whether a response of the UICC is received at each level. With no response of the UICC, the processor may maintain the third voltage level of the received response, and commence the communication by outputting a reset signal from low to high to reset the UICC of the corresponding class and transmitting a control signal.

Figure 11:
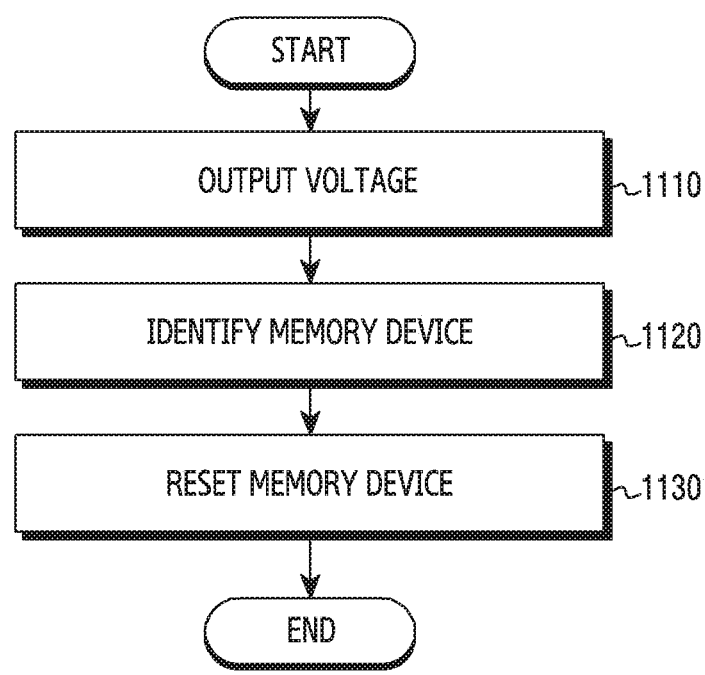
FIG. 11 illustrates yet another example of connecting an electronic device to various types of a memory device according to an embodiment of the disclosure.

FIG. 11 illustrates yet another example of connecting an electronic device 101, 200, or 300 with various types of a memory device 102, 410, 530, or 650 according to an embodiment of the disclosure.

Referring to FIG. 11, in operation 1110, the processor 120, 210, or 310 may output at least one voltage of a designated level for driving the memory device, through at least one power terminal. The designated voltage level may be, for example, the third voltage applied through the VCC terminal 531 of FIG. 5 or the VDD2 terminal 671 of FIG. 6. The third voltage level may be the lowest level for driving the memory device. For example, the third voltage level may be a low level (e.g., 1.62V to 1.98V) for driving the UICC class C. In this case, the third voltage may be equal to or lower than the second voltage for driving the UFS card.

In operation 1120, the processor identifies a type of the memory device according to a response from the memory device. The type of the memory device includes a UICC, a different UICC type (e.g., classes A, B, C), a UFS card, an SD card, and so on. For example, if the processor outputs the third voltage level (e.g., 1.8V) corresponding to the UICC class C to the memory device and the memory responds to it, the processor may identify the corresponding memory device as the UICC of the class C.

That is, the memory device may not be damaged by setting the third voltage level to the lowest level of designated voltage levels of the driving power according to the type of the memory device. If receiving no response from the memory device for the third voltage of the low level, the processor may identify whether the memory device is a UFS card by ramping up the third voltage level, before identifying whether the memory device is other class (e.g., class B or C) UICC.

The UFS card may be identified by detecting a CD signal level which is the output signal of, for example, the CD terminal 665 or the CMD terminal 425. For example, the processor may identify the UFS card if the CD signal level is low, and identify no UFS card if the CD signal level is high.

After identifying the memory device, the processor may perform communication by resetting the memory device according to the identified memory device type in operation 1130.

The processor according to various embodiments may output the designated voltage level for driving the memory device and then identify the memory device type according to the response of the memory device.

Figure 12:
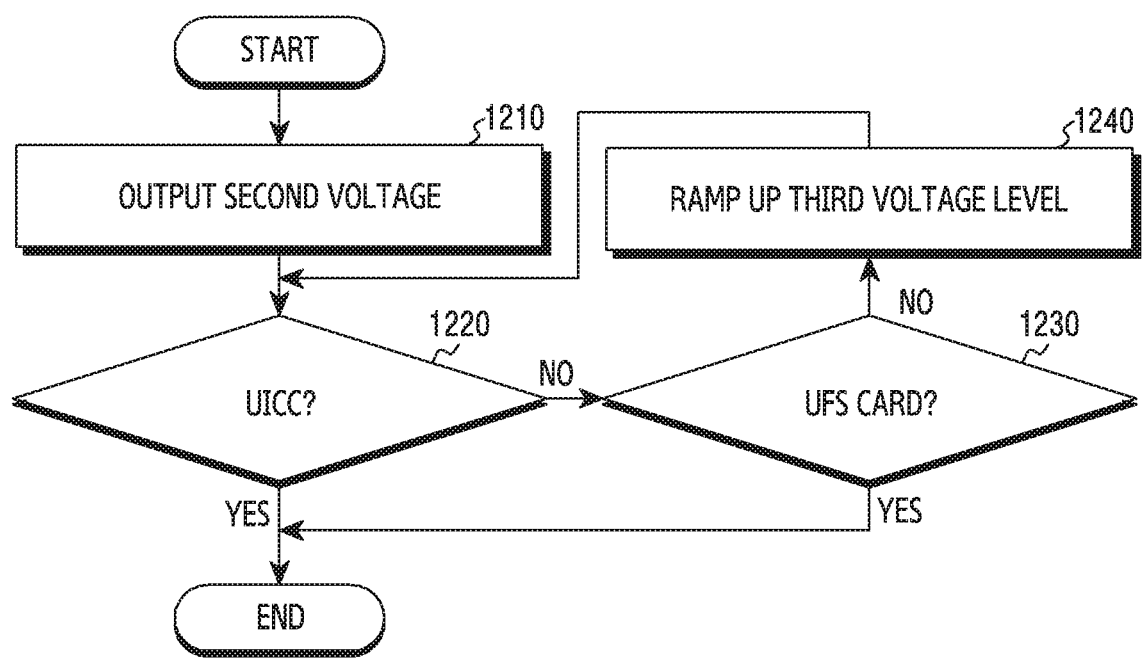
FIG. 12 illustrates an example of driving various types of a memory device in an electronic device according to an embodiment of the disclosure.

FIG. 12 illustrates an example of driving various types of a memory device 102, 410, 530, or 650 in an electronic device 101, 200, or 300 according to an embodiment of the disclosure. Operations 1210, 1220, and 1230 of FIG. 12 may be related to operations 1110 and 1120 of FIG. 11.

Referring to FIG. 12, the processor 120, 210, or 310 may output a second voltage of a designated level (e.g., 1.8V) for driving, for example, the UICC class C in operation 1210. The designated voltage level may be applied through, for example, the VCC terminal 531 of FIG. 5.

Depending on whether a response is received from the memory device, the processor identifies whether the memory device is the UICC in operation 1220. With no response from the memory device, the processor determines no UICC class C. If the memory device responds to the second voltage level (e.g., 1.8V) corresponding to the UICC class C, the processor may identify that the corresponding memory device is the UICC class C.

If determining no UICC class C for no response from the memory device, the processor identifies whether the memory device is a UFS card in operation 1230. That is, before identifying whether the memory device is the UICC of other class (e.g., the class B or C) by increasing the second voltage level, the processor may identify whether the memory device is the UFS card, thus preventing damage of the UFS card due to the high voltage. For doing so, the processor may detect the signal level of, for example, the CD terminal 665 or the CMD terminal 425, determine the UFS card if the level is low, and determine no UFS card if the level is high.

If the memory device is neither the UICC class C nor the UFS card, the processor may output the third voltage by increasing the second voltage level in operation 1240. For example, the processor may be configured to ramp up the second voltage level to, for example, the third voltage level (e.g., 2.7V to 3.3V) for driving the UICC class B, identify whether the memory device is the UICC class B by identifying a response of the memory device, ramp up, for no response, to the fourth voltage level (e.g., 4.5V to 5.5V) for driving the UICC class A, and identify whether the memory device is the UICC class A by identifying a response of the memory device.

Figure 13:
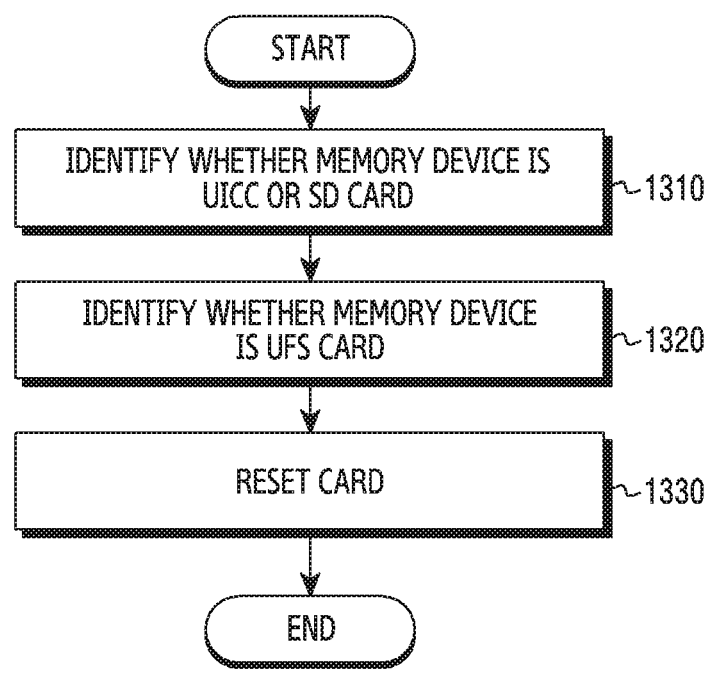
FIG. 13 illustrates still another example of connecting an electronic device to various types of a memory device according to an embodiment of the disclosure.

FIG. 13 illustrates still another example of connecting an electronic device 101, 200, or 300 with various types of a memory device 102, 410, 530, or 650 according to an embodiment of the disclosure.

Referring to FIG. 13, the processor 120, 210, or 310 may output at least one voltage of a designated level for driving the memory device through at least one power terminal and identify whether the memory device is a UICC or an SD card in operation 1310. The designated voltage level may be a plurality of voltages including the third voltage applied through, for example, the VCC terminal 531 or the VDD2 terminal 671 and the first voltage level (e.g., 1.8V or 3.3V) applied through the VDD1 terminal 411 of FIG. 4 or the VDD1 terminal 651 of FIG. 6 to drive the SD card or the UFS card. The third voltage level may be the lowest level for driving the memory device. For example, the third voltage level may be the low level (e.g., 1.62V to 1.98V) for driving the UICC class C. In this case, the third voltage level may be equal to or lower than the second voltage for driving the UFS card.

The processor may identify the type of the memory device according to whether a response is received from the memory device. For example, if receiving from the memory device the response to the third voltage level (e.g., 1.8V) corresponding to the UICC class C, the processor may identify the corresponding memory device as the UICC class C. As outputting the first voltage, the processor may identify whether the memory device is the SD card according to the response of the memory device.

If the memory device is not the UICC class C, the processor may identify whether the memory device is the UFS card before increasing the third voltage in operation 1320. For doing so, the processor may determine whether the memory device is the UFS card by detecting the signal level of, for example, the CD terminal 665 or the CMD terminal 425. By contrast, the processor may output the third voltage of the designated level (e.g., 1.8V) and the first voltage of the designated level and identify whether the memory device is the UFS card according to the response of the memory device. If the memory device is not the UFS card, the processor may ramp up the third voltage level to, for example, the level (e.g., 2.7V to 3.3V) for driving the UICC class B, identify whether the memory device is the UICC class B by identifying a response of the memory device, ramp up, for no response, to the level (e.g., 4.5V to 5.5V) for driving the UICC class A, and identify whether the memory device is the UICC class A by identifying a response of the memory device.

The processor, upon identifying the memory device, may perform communication by resetting the memory device according to the identified memory device type in operation 1330.

According to various embodiments, the processor may output the designated voltage level for driving the memory device and then identify the type of the memory device according to the response of the memory device.

The designated voltage level for driving the memory device is not limited to those as mentioned above, and may be changed to various values according to implementation or standard of the memory device. The order of the memory device identification is not limited to those as mentioned above and may change depending on the voltage level for driving the memory device.

Figure 14:
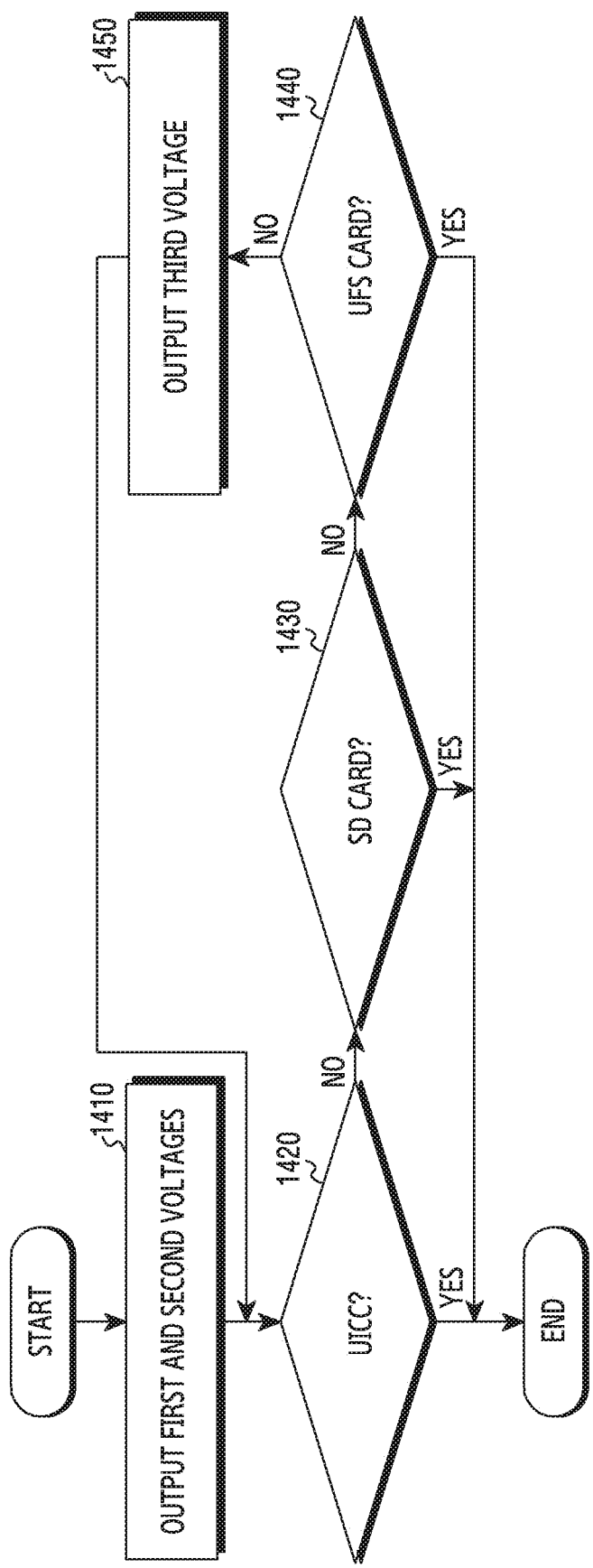
FIG. 14 illustrates another example of driving various types of a memory device in an electronic device according to an embodiment of the disclosure.

FIG. 14 illustrates another example of driving various types of a memory device 102, 410, 530, or 650 in an electronic device 101, 200, or 300 according to an embodiment of the disclosure.

Referring to FIG. 14, the processor 120, 210, or 310 may output the first voltage and the second voltage of designated levels for driving the memory device in operation 1410. The first voltage may be of the level (e.g., 1.8V or 3.3V) applied through, for example, the VDD1 terminal 411 of FIG. 4 or the VDD1 terminal 651 of FIG. 6 to drive the SD card or the UFS card. The second voltage may be of the low level (e.g., 1.8V or 1.62V to 1.98V) applied through, for example, the VCC terminal 531 or the VDD2 terminal 671 to drive the UICC class C or the UFS card.

By outputting the first voltage and the second voltage, the processor may identify the memory device based on a response of the driven memory device. For example, the processor may identify the type of the memory device based on signals transceived with the memory device. For example, if transmitting or receiving the signal to or from the memory device driven with the second voltage level (e.g., 1.8V) corresponding to the UICC class C, the processor may determine whether the corresponding memory device is the UICC class C in operation 1420. By transmitting or receiving the signal to or from the memory device driven with the first voltage level, the processor may determine whether the corresponding memory device is the SD card in operation 1430. By transmitting or receiving the signal to or from the memory device driven with the second voltage level, the processor may determine whether the corresponding memory device is the UFS card in operation 1440.

If the memory device is neither of the UICC class C, the SD card, and the UFS card, the processor may identify whether the memory device is the UICC class B by ramping up the second voltage level to the third voltage level (e.g., 2.7V to 3.3V) for driving the UICC class B, and for no response, identify whether the memory device is the UICC class A by ramping up to the voltage level (e.g., 4.5V to 5.5V) for driving the UICC class A, at operation 1450.

According to various embodiments, the processor may output the designated voltage level for driving the memory device and then identify the type of the memory device according to the response of the memory device.

The designated voltage level for driving the memory device is not limited to those as mentioned above, and may be changed to various values according to the implementation or the standard of the memory device. The order of the memory device identification is not limited to those as mentioned above and may change depending on the voltage level for driving the memory device.

As set forth above, an electronic device 101, 200 or 300 according to various embodiments may include a connector 220 or 420 for mounting at least one of a UFS card 650, an SD card 410, a UICC 530, and including a first power terminal for connecting the SD card or the UFS card, a second power terminal for connecting the UFS card or the UICC, and one or more signal terminals for connecting at least one of the UFS card, the SD card, and the UICC, and a processor 120, 210, or 310, wherein the processor is configured to detect a card mounted in the connector, if the card corresponds to the UFS card, output to the UFS card a first designated voltage through the first power terminal and a second designated voltage through the second power terminal, and reset the UFS card through the one or more signal terminals, and if the card does not correspond to the UFS card, output the first designated voltage through the first power terminal and a third designated voltage through the second power terminal, and reset a corresponding one of the SD card and the UICC through the one or more signal terminals.

In various embodiments, the connector may include at least one common signal terminal for connecting the UFS card or the SD card.

In various embodiments, the electronic device may further include a switch for selectively transmitting or receiving a signal to or from the UFS or the SD card through the at least one common signal terminal.

In various embodiments, the electronic device may further include a switch for selectively outputting the second designated voltage or the third designated voltage through the second power terminal.

In various embodiments, the electronic device may further include a power circuit for outputting the first designated voltage to the first power terminal and selectively outputting the second designated voltage or the third designated voltage to the second power terminal.

In various embodiments, the connector may include a signal terminal for identifying the UFS card, and the processor may identify a voltage of the signal terminal and determines based at least on the voltage whether the card corresponds to the UFS card.

In various embodiments, the signal terminal for identifying the UFS card may be a common signal terminal for connecting to the UFS card or the SD card.

According to various embodiments, a UFS 102 or 650 which is detachable from an electronic device may include a housing, a first power terminal for receiving a first designated voltage and a second power terminal for receiving a second designated voltage from the electronic device, and one or more signal terminals for connecting the electronic device, wherein the first power terminal is disposed in a first region (e.g., the region A of FIG. 6) of at least one surface of the housing to correspond to a power terminal of a UICC, and the second power terminal is disposed in a second region (e.g., the region B of FIG. 6) of the at least one surface of the housing to correspond to a power terminal of an SD card.

In various embodiments, if the housing is coupled to the electronic device, the first power terminal disposed in the first region may be connected to a power terminal corresponding to the power terminal of the UICC among power terminals of a connector of the electronic device.

In various embodiments, if the housing is coupled to the electronic device, the second power terminal disposed in the second region may be connected to a power terminal corresponding to the power terminal of the SD card among power terminals of a connector of the electronic device.

In various embodiments, the one or more signal terminals may include a signal terminal for identifying the UFS.

In various embodiments, the signal terminal for identifying the UFS may be disposed in the second region to connect to a signal terminal corresponding to a signal terminal of the SD card among signal terminals of the connector of the electronic device.

In various embodiments, the one or more signal terminals may include a plurality of signal terminals, and are disposed in the second region to transmit or receive a signal by connecting to signal terminals corresponding to signal terminals of the SD card among the signal terminals of the connector of the electronic device.

In various embodiments, the first region and the second region may be spaced from each other over a designated distance on the same surface of the housing.

According to various embodiments, an electronic device 101, 200, or 300 may include a connector for mounting at least one of a UFS card 650, an SD card 410, and a UICC 530, and including a first power terminal for connecting the SD card or the UFS card, a second power terminal for connecting the UFS card or the UICC, and one or more signal terminals for connecting at least one of the UFS card, the SD card, and the UICC, and a processor, wherein the processor may be b configured to output a second designated voltage through the second power terminal, identify the card based on a response from the card, if identifying the card as the UICC, reset the UICC through the one or more signal terminals, and if the card does not correspond to the UICC, output a third designated voltage of a higher level than the second designated voltage through the second power terminal.

In various embodiments, the processor may be configured to output a first designated voltage through the first power terminal, and if the card is identified as the SD card, reset the SD card through the one or more signal terminals.

In various embodiments, if identifying based on a response of the card for the third designated voltage that the card is not the UICC, the processor may be configured to output a fourth designated voltage of a higher level than the third designated voltage through the second power terminal.

In various embodiments, if outputting the second designated voltage and the second designated voltage and identifying the card as the UICC, the processor may be configured to reset the UICC.

In various embodiments, the connector may include a signal terminal for identifying the UICC, and the processor may be configured to identify a voltage of the signal terminal and determine whether the card corresponds to the UICC, based at least on the voltage.

In various embodiments, the signal terminal may be a common signal terminal for connecting the UFS card or the SD card, and if a low signal level is detected through the signal terminal, the processor may be configured to determine that the card is the UFS card.

A UFS and an electronic device according to various embodiments provide the UFS having a new structure, and the electronic device may mount and connect not only an existing memory device but also the present UFS to transmit and receive data.

A UFS and an electronic device according to various embodiments may be designed to optimize a structure and operations for connecting to other memory device including the UFS.

An electronic device according to various embodiments may mount, connect, and exchange data with various types of a memory device in a limited space without causing physical or electrical damage.

The methods according to the embodiments described in the claims or the specification of the disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, the program may be stored to a memory combining part or all of those recording media. A plurality of memories may be equipped.

The program may be stored in an attachable storage device accessible via a communication network such as Internet, Intranet, local area network (LAN), wide LAN (WLAN), or storage area network (SAN), or a communication network by combining these networks. The storage device may access the electronic device through an external port. A separate storage device may access the device over the communication network.

In the specific embodiments of the disclosure, the elements included in the disclosure are expressed in a singular or plural form. However, the singular or plural expression is appropriately selected according to a proposed situation for the convenience of explanation and the disclosure is not limited to a single element or a plurality of elements. The elements expressed in the plural form may be configured as a single element, and the elements expressed in the singular form may be configured as a plurality of elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a connector for mounting at least one of a universal flash storage (UFS) card, a secure digital (SD) card, or a universal integrated circuit card (UICC), the connector comprising:
a first power terminal for connecting the SD card or the UFS card,
a second power terminal for connecting the UFS card or the UICC, and
one or more signal terminals for connecting at least one of the UFS card, the SD card or the UICC; and
at least one processor configured to:
detect a card mounted in the connector,
output to the card a first designated voltage through the first power terminal and a second designated voltage through the second power terminal, identify that the card corresponds to the UFS card and reset the UFS card through the one or more signal terminals based on receiving a response from the UFS card, and if the card does not correspond to the UFS card, output to the card the first designated voltage through the first power terminal and a third designated voltage of a higher level than the second designated voltage through the second power terminal, and reset the SD card or the UICC through the one or more signal terminals based on a response received from one of the SD card or the UICC.

2. The electronic device of claim 1, wherein the connector comprises at least one common signal terminal for connecting the UFS card or the SD card.

3. The electronic device of claim 2, further comprising:
a switch for selectively transmitting or receiving a signal to or from the UFS card or the SD card through the at least one common signal terminal.

4. The electronic device of claim 1, further comprising:
a switch for selectively outputting the second designated voltage or the third designated voltage through the second power terminal.

5. The electronic device of claim 1, further comprising:
a power circuit for outputting the first designated voltage to the first power terminal and selectively outputting the second designated voltage or the third designated voltage to the second power terminal.

6. The electronic device of claim 1,
wherein the connector comprises a signal terminal of the one or more signal terminals for identifying the UFS card, and
wherein the at least one processor is further configured to:
identify a voltage of the signal terminal, and
determine whether the card corresponds to the UFS card based on the voltage.

7. The electronic device of claim 6, wherein the signal terminal for identifying the UFS card is a common signal terminal for connecting to the UFS card or the SD card.

8. The electronic device of claim 1, wherein the first designated voltage is a lower voltage than the second designated voltage.

9. The electronic device of claim 8, wherein the second designated voltage is a lower voltage than the third designated voltage.

10. The electronic device of claim 1, wherein the at least one processor increases voltages output through at least one of the first power terminal or the second power terminal while performing identification of the card to prevent the card from being damaged by high voltage.

11. A universal flash storage (UFS) card which is detachable from an electronic device, comprising:
a housing;
a first power terminal for receiving a first designated voltage and a second power terminal for receiving a second designated voltage from the electronic device;
one or more signal terminals for connecting the electronic device; and
a processor configured to:
in response to receiving the first designated voltage through the first power terminal and the second designated voltage through the second power terminal, transmit a response to the electronic device for identifying whether the UFS card is attached to the electronic device,
wherein the first power terminal is disposed in a first region of at least one surface of the housing to correspond to a power terminal of a universal integrated circuit card (UICC), and wherein the second power terminal is disposed in a second region of the at least one surface of the housing to correspond to a power terminal of a secure digital (SD) card.

12. The UFS card of claim 11, wherein the first power terminal is disposed in the first region and connected to the power terminal of the UICC among power terminals of a connector of the electronic device.

13. The UFS card of claim 11, wherein the second power terminal is disposed in the second region and connected to the power terminal of the SD card.

14. The UFS card of claim 13, wherein the one or more signal terminals comprise a signal terminal for identifying the UFS card.

15. The UFS card of claim 13, wherein the signal terminal for identifying the UFS card is disposed in the second region to connect to a signal terminal of the SD card.

16. The UFS card of claim 13, wherein the one or more signal terminals comprise a plurality of signal terminals that are disposed in the second region to transmit or receive a signal by connecting to signal terminals of the SD card.

17. The UFS card of claim 11, wherein the first region and the second region are spaced from each other over a designated distance on the same surface of the housing.

18. An electronic device comprising:
a connector for mounting a card, the card comprises at least one of a universal flash storage (UFS) card, a secure digital (SD) card, or a universal integrated circuit card (UICC), the connector comprising:
a first power terminal for connecting the SD card or the UFS card,
a second power terminal for connecting the UFS card or the UICC, and
one or more signal terminals for connecting at least one of the UFS card,
the SD card, and the UICC; and
at least one processor, configured to:
output a second designated voltage through the second power terminal,
identify the card based on a response from the card,
if identifying the card as the UICC, reset the UICC through the one or more signal terminals, and
if the card does not correspond to the UICC, output a third designated voltage of a higher level than the second designated voltage through the second power terminal.

19. The electronic device of claim 18, wherein the at least one processor is further configured to:
output a first designated voltage through the first power terminal; and
if the card is identified as the SD card, reset the SD card through the one or more signal terminals.

20. The electronic device of claim 19, wherein, if outputting the second designated voltage and the second designated voltage and identifying the card as the UICC, the at least one processor is further configured to reset the UICC.

21. The electronic device of claim 18, wherein, if identifying based on a response of the card for the third designated voltage that the card is not the UICC, the at least one processor is further configured to output a fourth designated voltage of a higher level than the third designated voltage through the second power terminal.

22. The electronic device of claim 18,
wherein the connector comprises a signal terminal for identifying the UICC, and wherein the at least one processor is further configured to identify a voltage of the signal terminal and determine whether the card corresponds to the UICC, based at least on the voltage.

23. The electronic device of claim 22,
wherein the signal terminal is a common signal terminal for connecting the UFS card or the SD card, and
wherein, if a low signal level is detected through the signal terminal, the at least one processor is further configured to determine that the card is the UFS card.

* * * * *